United States Patent [19]

Colavin

[11] Patent Number: 5,337,267

[45] Date of Patent: Aug. 9, 1994

[54] SQUARING CIRCUIT FOR BINARY NUMBERS

[75] Inventor: Osvaldo Colavin, Voreppe, France

[73] Assignee: SGS-Thomson Microelectronics S.A., Saint-Genis Pouilly, France

[21] Appl. No.: 970,139

[22] Filed: Nov. 2, 1992

[51] Int. Cl.⁵ .......................... G06F 7/38; G06F 15/32
[52] U.S. Cl. ...................................... 364/753; 364/735
[58] Field of Search ............... 364/753, 754, 757, 758, 364/735

[56] References Cited

U.S. PATENT DOCUMENTS

| | | | |
|---|---|---|---|
| 4,313,174 | 1/1982 | White | 364/753 |
| 4,410,956 | 10/1983 | Yoshida | 364/753 |
| 4,787,056 | 11/1988 | Dieterich | 364/753 |

OTHER PUBLICATIONS

Computer Design, vol. 11, No. 4, Apr. 1972, Littleton, Mass., pp. 100–104, A. Hemel "Square Root Extraction with Read-Only Memories".

*Primary Examiner*—Jerry Smith
*Attorney, Agent, or Firm*—Wolf, Greenfield & Sacks

[57] ABSTRACT

A squaring circuit for a binary number X of n bits $x_0$ to $x_{n-1}$, includes a table of the squares of numbers p constituted by bits $x_1$ to $x_{n-2}$. An adder for adding numbers of $2n-3$ bits receives at a first input a number constituted by bit $x_{n-1}$, positioned on the left of the square $p^2$ provided by the table. A first switching element receives the number p and provides same to the $n-2$ low weight lines of a second input of the adder if bit $x_0$ is equal to 1. A second switching element receives number p and provides same to the $n-2$ high weight lines of the second input if bit $x_{n-1}$ is equal to 1. An AND gate is connected to the remaining line of the second input and receives the bits $x_0$ and $x_{n-1}$. The square $X^2$ of X is constituted by the adder output, to which a bit 0 and the bit $x_0$ are positioned on the right.

21 Claims, 2 Drawing Sheets

SQUARING CIRCUIT FOR BINARY NUMBERS

BACKGROUND OF THE INVENTION

1. Field of the Invention

The present invention relates to a squaring circuit for raising to the second power a binary number of n bits and more particularly to such a circuit including a table of squared numbers, which is stored in a nonvolatile memory element (i.e. ROM).

2. Discussion of the Related Art

Conventionally, a circuit for raising to the second power a binary number X is achieved by multiplying X by itself with a binary multiplying circuit. A binary circuit for multiplying 8-bit numbers requires approximately 1,500 transistors in conventional technologies and architectures. Such a conventional circuit is called a multiplier and a common drawback includes the large surface area used.

An alternative for achieving a squaring circuit of an 8-bit binary number X is to store in a ROM memory element all of the squares of n-hi t numbers and to select one of these squares by addressing one of the squares. This addressing occurs by applying number X on the address lines of the ROM. If number X is composed of n bits, $2^n$ numbers of 2n bits will have to be stored in the ROM (the square of an n-bit number is a number including, at the most, 2n bits). Hence, in this example, a ROM of $2^n \times 2n$ bits is required. A ROM including all the squares of 8-bit numbers includes approximately 1,900 transistors. Since these transistors are very orderly arranged, the ROM can be easily devised so as to occupy, for $n<10$, an equal or even smaller silicon surface than an equivalent conventional multiplier circuit (using the same technology).

SUMMARY OF THE INVENTION

Accordingly, an object of the present invention is to provide a squaring circuit including a ROM having a size at least four times smaller than the size of a ROM used in a conventional equivalent squaring circuit.

This object and other advantages and features of the invention is achieved with a circuit for providing the square of a binary number X having n bits with weights increasing from 0 to $n-1$, the circuit includes a table of the squares of binary numbers p. Each number p is constituted only by the bits of weight 1 to $n-2$ of number X. The circuit further includes: an adder, for adding numbers of $2n-3$ bits, receiving at a first input a number constituted by the bit of weight $n-1$ of number X, positioned on the left of the square p2 provided by the table; a first switching element receiving the number p and providing same to the $n-2$ lines of low weight of a second input of the adder if the low weight bit of number X is equal to 1; a second switching element receiving the number p and providing same to the $n-2$ lines of high weight of the second input of the adder if the bit of weight $n-1$ of number X is 1; a third switching element providing a 1 to the remaining line of the second input of the adder if the bits of weight 0 and $n-1$ of number X are both 1. The square $X^2$ of number X is constituted by the adder output, to which output are positioned on the right side a bit 0 and the lowest weight bit of number X.

According to an embodiment of the invention, the table is a memory element storing only the $2(n-2)-2$ high weight bits of number $p^2$. Number $p^2$ is constituted by the memory output to which are positioned on the right side a bit 0 and the bit of weight 1 of number X.

According to this embodiment of the invention, the first switching element includes $n-2$ AND gates, the first inputs of which receive the lowest weight bit of number X and the second inputs of which respectively receive one of the bits of number p.

According to this embodiment of the invention, the second switching element includes $n-2$ AND gates, the first inputs of which receive the bit of weight $n-1$ of number X and the second inputs of which respectively receive one of the bits of number p.

According to this embodiment of the invention, the third switching element is comprised of an AND gate, receiving at the inputs the bits of weight 0 and $n-1$ of number X.

The foregoing and other objects, features, aspects and advantages of the invention will become apparent from a reading of the following detailed description of the present invention when taken in conjunction with the accompanying drawings.

DETAILED DESCRIPTION

Assuming that it is desired to provide the square of a number X including n bits, $$X = 2^{n-1}x_{n-1} + \ldots + 2^1 x_1 + 2^0 x_0,$$

where $x_0 \ldots x_{n-1}$ designate respectively the bits of weights 0 to $n-1$ of number X.

A circuit according to the invention provides the square of this number, as described below.

Number X can be written in the form:

$$X = 2^{n-1}x_{n-1} + 2p + 2^0 x_0, \qquad (1)$$

where $p = 2^{n-3}x_{n-2} + \ldots + 2^1 x_2 + 2^0 x_1$.

Thus, by raising equation (1) to the second power and by simplifying the resulting equation, taking into account that $x_i^2 = x_i$ since $x_i = 1$ or 0, one obtains:

$$\begin{aligned}
x^2 &= (2^{n-1}x_{n-1} + 2p + x_0)^2 \qquad (2) \\
&= 2^{n+1}x_{n-1}p + 4x_0 p + 2^n x_0 x_{n-1} + \\
&\quad 4p^2 + 2^{2(n-1)}x_{n-1} + x_0 \\
&= T1 + T2 + T3 + T4 + T5 + T6.
\end{aligned}$$

Figure 1:
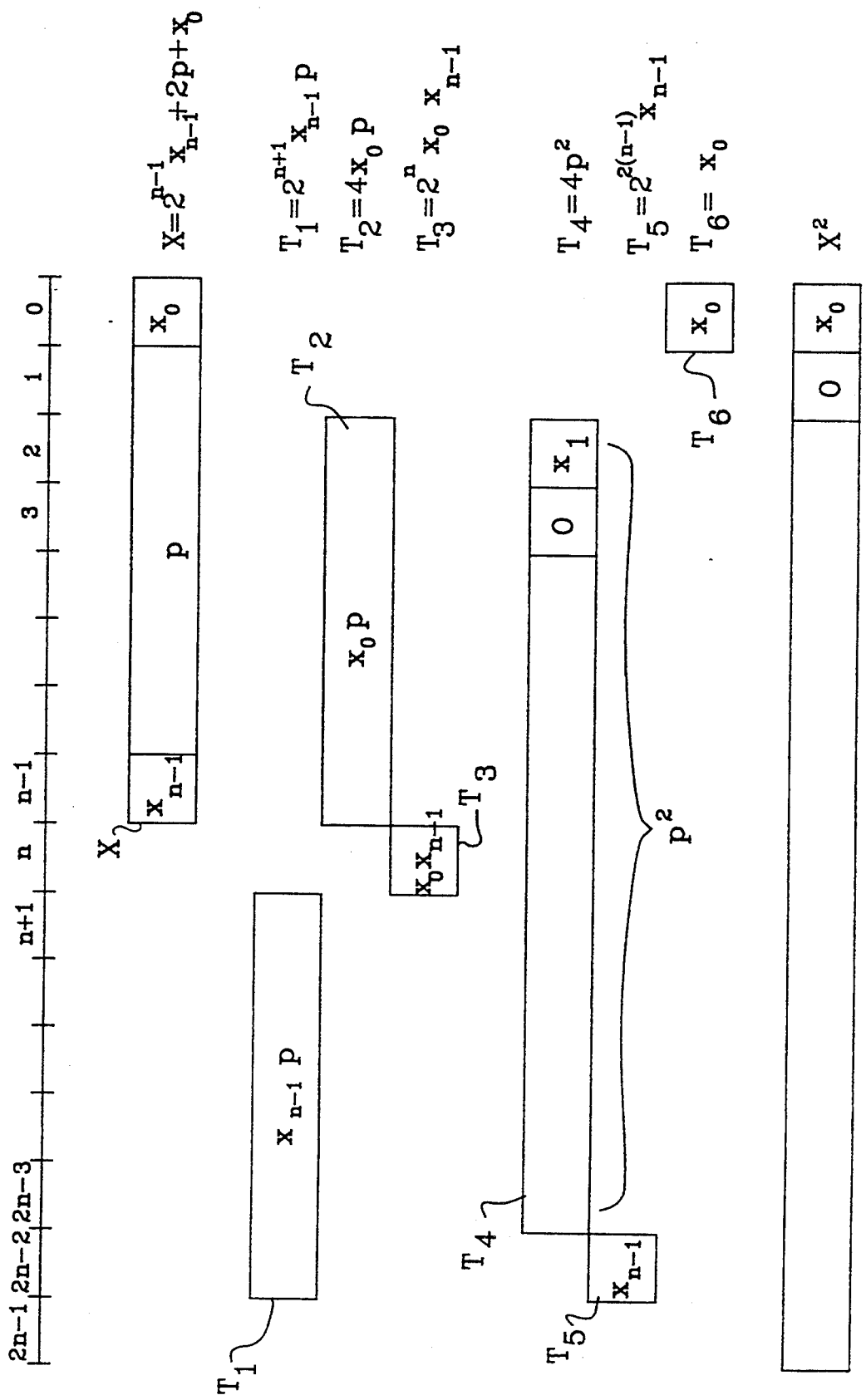
FIG. 1 symbolically and graphically illustrates a calculation method used by a squaring circuit according to the present invention.

FIG. 1 symbolically and graphically illustrates equation (2). Various binary numbers are shown in the form of rectangles divided into cells corresponding to bits. Each cell of the rectangles is disposed in a column which cot-responds to the weight of the bit of the particular cell. In FIG. 1, columns 0 to $2_{n-1}$ are numbered from right to left, the bits with the lowest weight corresponding to the rightmost column. An ordinary binary number expressed in the form $2^i z$, where z is a binary value of $n_z$ bits, can be represented by a rectangle having $n_z$ cells, the cell having the lowest weight being in column i. The cells of the rectangle are occupied by the bits of value z, which is indicated by writing this value in the rectangle. The column(s) that are not occupied by a rectangle correspond to null bits.

Rectangle X represents equation (1). The bits $x_0$ to $x_{n-1}$ of number X appear in columns 0 to $n-1$. Number p is formed by bits $x_1$ to $x_{n-2}$ of number X and appears in the rectangle X within the appropriate columns.

The six following rectangles represent terms T1–T6 of the right side of equation (2); the last rectangle represents result $X^2$.

Rectangle T1 represents the term
$$T1 = 2^{n+1} x_{n-1} p$$

of equation (2). This rectangle, as shown, occupies the $n-2$ columns $n+1$ to $2n-2$. Value $x_{n-1} p$ includes as many bits as number p since this value is obtained by a simple logic ANDing of each of the bits of number p and bit $x_{n-1}$.

Rectangle T2 represents the term $T2 = 4x_0 p = 2^2 x_0 p$ of equation (2). As shown, rectangle T2 occupies the $n-2$ columns 2 to $n-1$.

Rectangle T3 represents the term $T3 = 2^n x_0 x_{n-1}$.

As shown, rectangle T3 occupies column n only ($x_0 x_{n-1}$ corresponds to one bit).

In viewing rectangles T1, T2 and T3, it can be seen that the sum T1+T2+T3 is in fact equal to a number formed by the juxtaposition of values $x_{n-1} p$, $x_0 x_{n-1} p$ and $x_0 p$ followed by two 0s. Hence, a binary adder is not required to sum terms T1–T3 since, physically, a corresponding juxtaposition of the columns carrying the above value bits simply forms the sum.

Rectangle T4 represents the term $$T4 = 4p^2 = 2^2 p^2$$

of equation (2). As shown, rectangle T4 occupies the $2(n-2)$ columns 2 to $2_{n-3}$.

Rectangle T5 represents the term $T5 = 2^{2(n-1)} x_{n-1}$.

As shown, rectangle T5 occupies column $2_{n-2}$.

Rectangle T6 represents the term $T6 = x_0$ and, as shown, occupies column 0. The sum of terms T4, T5 and T6 is obtainable by a simple juxtaposition of values $x_{n-1}$, $p^2$, 0 and x0, which operation avoids the use of a binary adder.

In addition, FIG. 1 shows that for any value of number X, the bit of weight 1 of number $X^2$ (represented by rectangle $X^2$) is always null and that the bit of weight 0 is always equal to bit $x_0$ of weight 0 of number X. Thus, it is not necessary to store the bits of weight 0 and 1 of number $p^2$ because they are known to be respectively equal to the bit $x_1$ of number p (which is the bit of weight 1 of number X) and to 0. Number $p^2$ can thus be obtained, as shown in rectangle T4, by positioning the numbers 0 and $x_1$ on the right of its $2(n-2)-2$ bits of higher weight.

The sum of the six terms T1–T6 is reduced to a single sum of the number corresponding to the juxtaposition of rectangles T1–T3 and of the number corresponding to the juxtaposition of rectangles T4 and T5. A null bit and bit $x_0$ (T6) are then positioned on the right of this sum to provide number $X^2$. These last two bits are known to exist in their respective positions for all values of X, as described above.

This analysis teaches that instead of storing $2^n$ squares of X, it is merely necessary to store $2^{n-2}$ squares of p. Thus, the amount of squares necessary to store is one quarter of that of the conventional binary multiplier. Moreover, only the $2(n-2)-2=2n-6$ high weight bits of numbers $p^2$, as opposed to the 2n bits of number $X^2$, as is done with conventional binary multipliers, are stored. The total amount of memory bits is therefore $2^{n-2}(2n-6) = 2^{n-1}(n-3)$, which provides a gain of surface area ("chip real estate") of $4n/(n-3)$ over the conventional binary multiplier. This gain approaches 4 as n approaches infinity. For 8-bit numbers X (a=8), this gain is 6.4.

According to the invention, in addition to the memory needed, additional circuits are required to carry out the digital logic. Such circuits include a $(2n-3)$-bit adder for summing values (T1+T2+T3) and (T4+T5) and logic gates for calculating the values $x_{n-1} p$, $x_0 p$ and $x_0 x_{n-1}$. Those skilled in the art will appreciate that these circuits occupy a small surface area in comparison to the surface spared by the use of a smaller memory.

Figure 2:
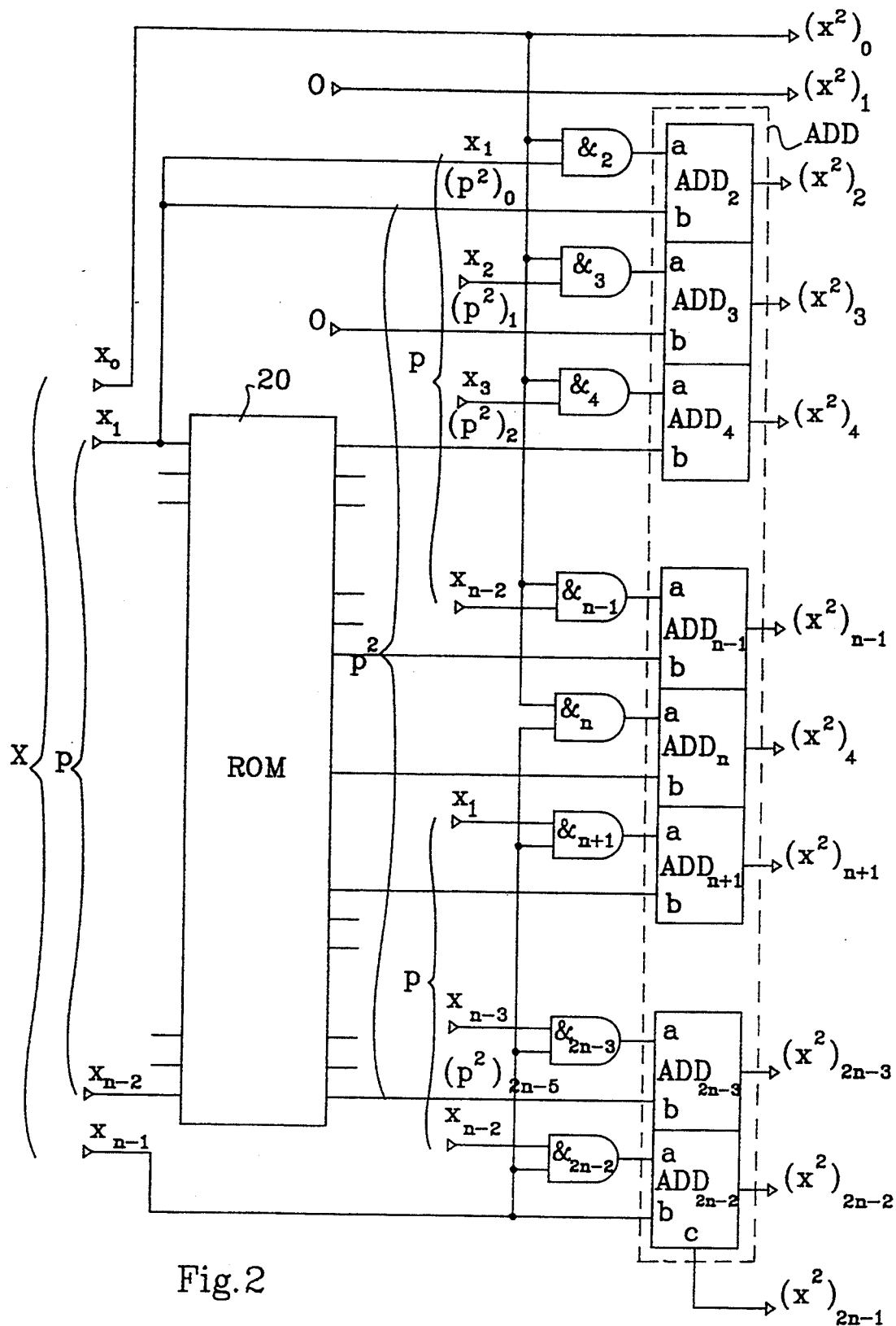
FIG. 2 illustrates in block diagram, schematic form, an embodiment of a squaring circuit according to the present invention.

FIG. 2 is a block diagram showing a preferred embodiment of the squaring circuit according to the present invention. Bits $x_0$ to $x_{n-1}$ of a number X, the square of which is to be calculated, are introduced into the circuit at lines $x_0$ to $x_{n-1}$. The $n-2$ lines $x_1$ to $x_{n-2}$, which carry the bits of number p, are connected to the address lines of ROM 20. ROM 20 outputs the $2n-6$ high weight bits $(p^2)_2$ to $(p^2)_{2n-5}$ of number $p^2$. The remaining low weight bit lines $(p^2)_1$ and $(p^2)_0$ are connected to line 0 and line $x_1$, respectively.

The circuit includes an adder ADD for adding the $2n-3$ bit numbers. Adder ADD comprises $2n-3$ elementary adders $ADD_2$ to $ADD_{2n-2}$ which respectively provide the bits of weight 2 to $2n-2$ of number $X^2$. Each elementary adder includes two bit inputs a and b and each carries an output c for transmitting a carry bit to an elementary adder having an immediately higher weight. The carry output of adder $ADD_{2n-2}$ provides the bit of weight $2n-1$ of number $X^2$. The carry outputs of the other adders are not shown.

Bits $(p^2)_0$ to $(p2)_{2n-5}$ are provided to inputs b of adders $ADD_2$ to $ADD_{2n-3}$. Input b of adder $ADD_{2n-2}$ is connected to line $x_{n-1}$. The bits of weight 0 and 1 of number $X^2$ are provided by line $x_0$ and a line connected to 0, respectively.

Input a of adders $ADD_2$ to $ADD_{2n-2}$ are connected to the output of AND gates $\&_2$ to $\&_{2n-2}$, respectively. A first input of AND gates $\&_2$ to $\&_{n-1}$ is connected to line $x_0$. Bits $x_1$ to $x_{n-2}$ of number p are provided to a second input of AND gates $\&_2$ to $\&_{n-1}$, respectively. AND gates $\&_2$ to $\&_{n-1}$ provide value $x_0 p$ to adders $ADD_z$ to $ADD_{n-1}$, respectively.

A first input of AND gates $\&_{n+1}$ to $\&_{2n-2}$ is connected to line $x_{n-1}$, and bits $x_1$ to $x_{n-2}$ of number p are respectively provided to a second input of these AND gates. AND gates $\&_{n+1}$ to $\&_{2n-2}$, respectively, provide value $x_{n-1} p$ to adders $ADD_{n+1}$ to $ADD_{2n-z}$.

The two inputs of gate $\&_n$ are connected to line $x_0$ and line $x_{n-1}$. AND gate $\&_n$ provides the number $x_0 x_{n-1}$ to adder $ADD_1$.

FIG. 2 shows that the arrangement of the AND gates and elementary adders is very orderly, permitting ease of placement of such elements on a small surface.

As will be apparent to those skilled in the art, various modifications can be made to the above disclosed preferred embodiment. In particular, AND gates $\&_2$ to $\&_{n-1}$ can be replaced with a multiplexer controlled by line $x_0$ and receiving a null binary number as one input and the number p as another input. A similar multiplexer, controlled by line $x_{n-1}$, can be substituted for AND gates $\&_{n+1}$ to $\&_{2n-2}$. The ROM can be replaced with any equivalent circuit, such as a programmable logic array (PLA), the output bits of which correspond to preprogrammed equations of the bits present at the input (on the address lines). Adder $ADD_2$ can be replaced with an AND gate receiving bit $x_1$ and the complementary of bit $x_0$ since $(X^2)2 = x_1.\overline{x_0}$.

The foregoing description is provided by way of example only and in no way is intended on being limiting. The scope of the present invention is defined by the appended claims and equivalents thereto.

What is claimed is:

1. A squaring circuit for raising to the second power a first binary number X of n bits, each bit having a weight assigned thereto, wherein the weights increase from 0 to n−1, the circuit comprising:
    a circuit responsive to a second binary number P including bits of weight 1 to n−2 of the first number X, for generating the square $P^2$ of the second binary number, the circuit arrangement includes a table stored in a memory having at least one bit of the $P^2$;
    an adder, coupled to the circuit, receiving at a first multi-bit input thereof, a number including bits of the square $P^2$ of the second binary number and a bit of weight n−1 of the first number X;
    a first switching element, coupled between the memory and the adder, receiving the second number P and providing the second number P to n−2 lines of low weight of a second input of the adder if the bit of weight 0 of the first number X is equal to b 1;
    a second switching element, coupled between the memory and the adder, receiving the second number P and providing P to n−2 high weight lines of the second input of the adder if the bit of weight n−1 of the first number X is equal to 1; and
    a third switching element, coupled between the memory and the adder, providing a 1 to a remaining line of the second input of the adder if bits of weight 0 and n−1 of the first number X are both equal to 1, wherein 1 represents a first predetermined logic level;
    wherein the square $X^2$ of the first number X is provided by an output of the adder, and to the output of the adder are added at predetermined positions a bit 0 and the bit of weight 0 of the first number X.

2. A circuit as claimed in claim 1 wherein the adder adds numbers of 2n−3 bits.

3. A circuit as claimed in claim 2 wherein the number constituted by the bit of weight n−1 of the first number X is added at a first predetermined position of $P^2$.

4. A circuit as claimed in claim 1 wherein the table includes 2(n−2)−2 high weight bits of the square $P^2$, which are provided by an output of the memory, and to the output of the memory are added at predetermined positions thereof a bit 0 and bit of weight 1 of the first number X to generate $P^2$.

5. A circuit as claimed in claim 1, wherein the first switching element includes n−2 AND gates, the n−2 AND gates having first inputs which receive the bit of weight 0 of the first number X and second inputs which receive one of the bits of the second number P.

6. A circuit as claimed in claim 1, wherein the second switching element includes n−2 AND gates, the n−2 AND gates having first inputs which receive the bit of weight n−1 of the first number X and second inputs which receive one of the bits of the second number P.

7. A circuit as claimed in claim 6, wherein the second switching element includes n−2 AND gates, the n−2 AND gates having first inputs which receive the bit of weight n−1 of the first number X and second inputs which receive one of the bits of the second number P.

8. A circuit as claimed in claim 1, wherein the third switching element includes an AND gate which receives bits of weights 0 and n−1 of the first number X.

9. A circuit as claimed in claim 8, wherein the third switching element includes an AND gate which receives bits of weights 0 and n−1 of the first number X.

10. A squaring circuit for raising to the second power a first binary number X of n bits, each bit having a weight assigned thereto, wherein the weights increase from 0 to n−1, the circuit comprising:
    means responsive to a second binary number P including bits of weight 1 to n−2 of the first number X, for generating the square $P^2$ of the second binary number, the means for generating including means for storing at least one bit of the $P^2$;
    means for adding numbers, coupled to the means for generating, receiving at a first multi-bit input thereof, a number constituted by the bit of weight n−1 of the first number X and bits of the square $P^2$;
    a first means for switching, coupled between the means for storing and the means for adding, receiving the second number P and providing the second number P to n−2 lines of low weight of a second input of the adder if a lowest weight bit of the first number X is equal to 1;
    a second means for switching, coupled between the means for storing and the means for adding, receiving the second number P and providing P to n−2 high weight lines of the second input of the adder if a bit of weight n−1 of the first number X is equal to 1; and
    a third means for switching, coupled between the means for storing and the means for adding, providing a 1 to a remaining line of the second input of the adder if bits of weight 0 and n−1 of the first number X are both equal to 1, wherein 1 represents a first predetermined logic level;
    wherein the square $X^2$ of the first number X is provided by an output of the means for adding, and to the output of the means for adding are added at predetermined positions thereof a bit 0 and lowest weight bit of the first number X.

11. A circuit as claimed in claim 10 wherein the means for adding adds numbers of 2n−3 bits.

12. A circuit as claimed in claim 11 wherein the bit of weight n−1 of the first number X is added at a first predetermined position of $P^2$.

13. A circuit as claimed in claim 10 wherein the means for storing includes a memory element which stores 2(n−2)−2 high weight bits of the square $P^2$ which are is provided by an output of the memory, and to the output of the memory are added at predetermined positions a bit 0 and bit of weight 1 of the first number X.

14. A circuit as claimed in claim 10, wherein the first means for switching includes n−2 AND gates, the n−2

AND gates having first inputs which receive a lowest weight bit of the first number X and second inputs which receive one of the bits of the second number P.

15. A circuit as claimed in claim 10, wherein the second means for switching includes n−2 AND gates, the n=2 AND gates having first inputs which receive a bit of weight n−1 of the first number X and second inputs which receive one of the bits of the second number P.

16. A circuit as claimed in claim 15, wherein the second means for switching includes n−2 AND gates, the n−2 AND ages having first inputs which receive a bit of weight n−1 of the first number X and second inputs which receive one of the bits of the second number P.

17. A circuit as claimed in claim 10, wherein the third means for switching includes an AND gate which receives bits of weights 0 and n−1 of the first number X.

18. A circuit as claimed in claim 17, wherein the third means for switching includes an AND gate which receives bits of weights 0 and n−1 of the first number X.

19. A squaring circuit comprising:
a circuit responsive to a second binary number P, wherein each number P includes bits of weight 1 to n−2 of a binary number X to be squared, wherein binary number X has n bits, each bit having a weight assigned thereto, wherein the weights increase from 0 to n−1, the circuit for generating the square $P^2$ of the second binary number and including a table stored in a membory having at least one bit of the $P^2$;

an adder, coupled to the circuit, receiving at a first multi-bit input thereof, a bit of weight n−1 of the first number X and bits of the square $P^2$ of the second binary number;

a first switching element, coupled between the memory and the adder, receiving the second number P and providing the second number P to n−2 lines of low weight of a second input of the adder if a lowest weight bit of the first number X is equal to 1, wherein 1 is a predetermined logic level;

a second switching element, coupled between the memory and the adder, receiving the second number P and providing P to n−2 high weight lines of the second input of the adder if a bit of weight n−1 of the first number X is equal to 1; and a third switching element, coupled between the memory and the adder, providing 1 to a remaining line of the second input of the adder if bits of weight 0 and n−1 of the first number X are both equal to 1; wherein the square $X^2$ of the first number X is provided by an output of the adder, and to the output of the adder are added at predetermined positions at bit 0 and lowest weight bit of the first number X.

20. A circuit as claimed in claim 19 wherein the adder adds numbers of 2n−3 bits.

21. A circuit as claimed in claim 20 wherein the bit of weight n−1 of the first number X is added at a predetermined position of the square $P^2$ of the second number P.

* * * * *